United States Patent [19]

Hsu

[11] Patent Number: 5,005,936
[45] Date of Patent: Apr. 9, 1991

[54] LONG RANGE BIDIRECTIONAL OPTICAL FIBER COMMUNICATION LINK

[75] Inventor: Hui-Pin Hsu, Northridge, Calif.

[73] Assignee: Hughes Aircraft Company, Los Angeles, Calif.

[21] Appl. No.: 527,228

[22] Filed: May 22, 1990

[51] Int. Cl.⁵ .............................................. G02B 6/28
[52] U.S. Cl. .............................. 350/96.16; 350/96.15
[58] Field of Search ............ 350/96.15, 96.16, 96.20, 350/96.10; 370/1, 3; 455/618, 619

[56] References Cited

U.S. PATENT DOCUMENTS 4,878,726 11/1989 Fatehi ............................. 350/96.16

Primary Examiner—William L. Sikes
Assistant Examiner—Robert E. Wise
Attorney, Agent, or Firm—C. D. Brown; R. M. Heald; W. K. Denson-Low

[57] ABSTRACT

A long-range optical fiber communication link overcoming certain constraints on signal transmission range imposed by fiber-induced loss is disclosed herein. A first embodiment of the communication link (10) of the present invention includes an optical fiber (16) having a first and a second end wherein the attenuation of optical energy passing therethrough at wavelengths included within a transmission window is substantially minimized. The inventive link (10) further includes a first arrangement (22) and (36) for launching a first optical carrier of a first wavelength onto the first end of the fiber (16). Provision is made within the launching arrangement (22) and (36) for impressing a first modulating signal spanning a first frequency spectrum upon the first carrier. The first embodiment also includes a second arrangement (26) and (37) for launching a second optical carrier of a second wavelength onto the second end of the fiber, wherein the second wavelength is included within the transmission window. The second launching arrangement (26) and (37) is further disposed to impress upon the second carrier a second modulating signal spanning a second frequency spectrum segregated from the first spectrum. A first receiver (64) of a first bandwidth encompassing the first frequency spectrum is coupled to the second end of the fiber (16). The first receiver (64) is operative to extract the first modulating signal from the first optical carrier. A second receiver (58) having a second bandwidth encompassing the second frequency spectrum is coupled to the first end of the fiber (16).

17 Claims, 2 Drawing Sheets

LONG RANGE BIDIRECTIONAL OPTICAL FIBER COMMUNICATION LINK

BACKGROUND OF THE INVENTION

1. Field of the Invention

This invention relates to fiber-optic communication systems. More specifically, this invention relates to bidirectional signal transmission within such communication systems.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

In certain remote-guidance systems communication with a guided vehicle is facilitated by an optical fiber linking the vehicle with a control station. The optical fiber is typically wound around a bobbin or secured by other means capable of dispensing the fiber as the vehicle travels downrange. An optical carrier of a first wavelength is used to transport commands from the control station to the vehicle, while digital data from the vehicle is impressed upon an optical carrier of a second wavelength and carried by the fiber to the control station. The rate at which data is transmitted from the vehicle to the control station (downlink data rate) is typically much larger than the converse rate (uplink data rate). In order to facilitate a high downlink data rate the bandwidth of the downlink channel typically spans a much wider frequency spectrum than does that of the uplink channel.

The relatively wide downlink bandwidth in conventional remote-guidance systems necessitates a wide bandwidth receiver within the control station. Unfortunately, the sensitivity of a receiver is inherently reduced upon an increase in signal bandwidth since the noise bandwidth thereof is proportionately enlarged. It follows that the sensitivity of the wideband receiver in the control station constitutes one limitation on the transmission range of conventional remote-guidance systems.

The wavelength of optical energy utilized in signal transmission along the link also affects transmission range. In particular, the loss suffered by light energy propagating within an optical fiber generally decreases as wavelength increases. As conventional fiber-optic communication links within vehicle guidance systems typically include carriers at 850 and 1300 nm. (nanometers) or alternatively at 850 nm. and 1060 nm., optical loss at 850 nm. may be dispositive as to transmission range. In fact, fiber-induced loss at 850 nm. has constrained the transmission range of conventional fiber-optic communication links to approximately 10 Km. Designers of conventional vehicle guidance systems have been precluded from utilizing designs which involve an increase in the wavelength of the shorter wavelength carrier (850 nm.) out of concern for the need to maintain adequate isolation between the uplink and downlink channels.

Hence, a need in the art exists for a fiber-optic communication link wherein transmission range is not limited by the fiber-induced loss at relatively short optical wavelengths.

SUMMARY OF THE INVENTION

The need in the art for an optical fiber link which overcomes the constraints on signal transmission range due to fiber-induced loss at short optical wavelengths is addressed by the long-range optical fiber communication link of the present invention. A first embodiment of the communication link of the present invention includes an optical fiber having a first and a second end wherein the attenuation of optical energy passing therethrough at wavelengths included within a transmission window is substantially minimized. The inventive link further includes a first arrangement for launching a first optical carrier of a first wavelength onto the first end of the fiber. Provision is made within the launching arrangement for impressing upon the first carrier a first modulating signal spanning a first frequency spectrum. The first embodiment also includes a second arrangement for launching a second optical carrier of a second wavelength onto the second end of the fiber, wherein the second wavelength is included within the transmission window. The second launching arrangement is further disposed to impress upon the second carrier a second modulating signal spanning a second frequency spectrum larger than the first spectrum. A first receiver of a first bandwidth encompassing the first frequency spectrum is coupled to the second end of the fiber. The first receiver is operative to extract the first modulating signal from the first optical carrier. Similarly, a second receiver having a second bandwidth encompassing the second frequency spectrum is coupled to the first end of the fiber. The second receiver is disposed to extract the second modulating signal from the second optical carrier.

DETAILED DESCRIPTION OF THE INVENTION

Figure 1:
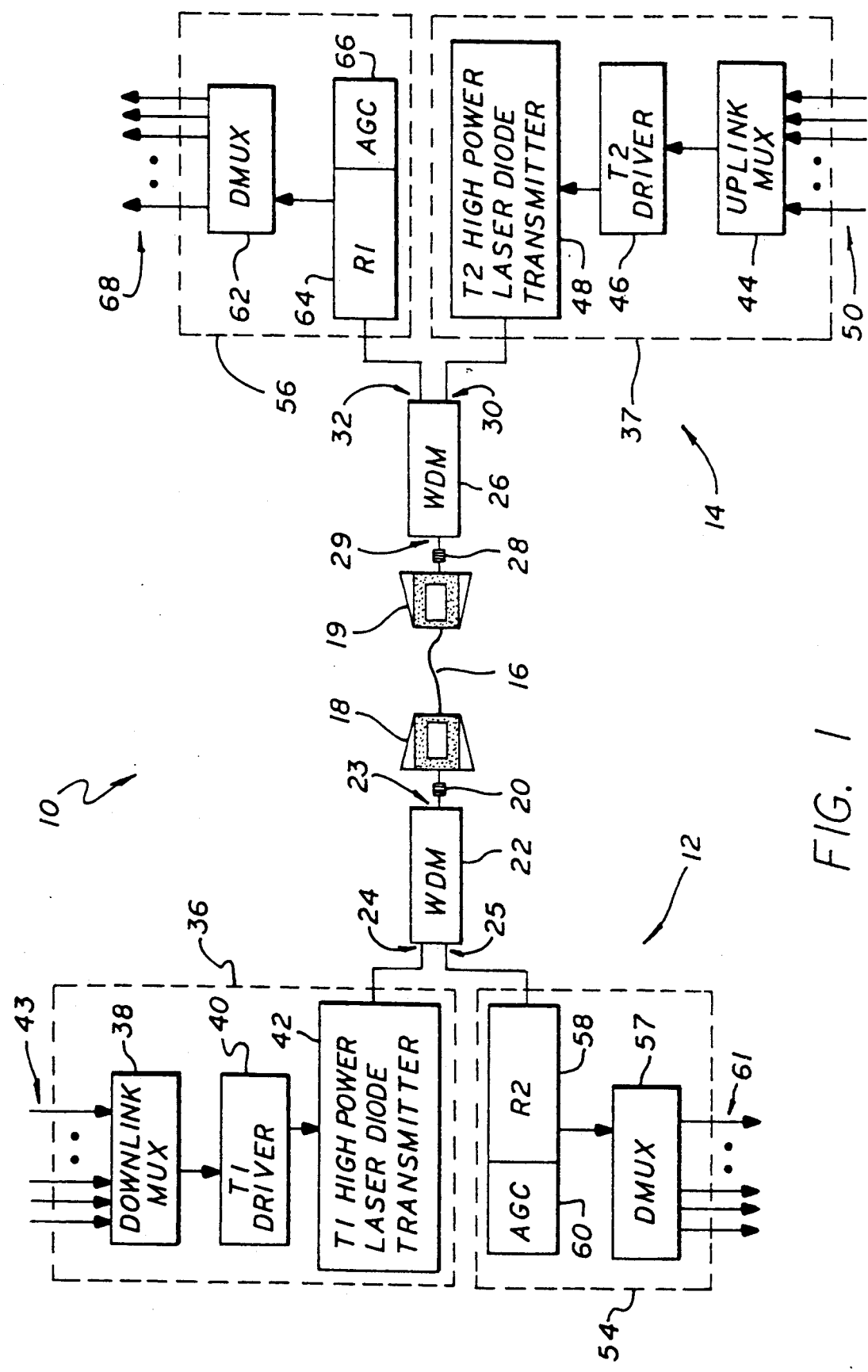
FIG. 1 is a block diagrammatic representation of a first embodiment of the long-range optical fiber communication link of the present invention.

A first embodiment of the long-range optical fiber communication link 10 of the present invention is shown in the block diagrammatic representation of FIG. 1. The communication link 10 facilitates communication between a vehicle subsystem 12 and control station subsystem 14 through an optical fiber 16 therebetween. In the first preferred embodiment of FIG. 1 the fiber 16 conducts signals impressed on an optical carrier of wavelength W1 from the vehicle 12 to the control station 14 and guides signals impressed on an optical carrier of wavelength W2 from the control station 14 to the vehicle 12. The fiber 16 is a conventional commercially available single mode optical fiber.

As mentioned in the Background of the Invention, fiber-induced attenuation of light energy passing through optical fibers typically decreases as optical wavelength increases. However, there exists a "transmission window" in certain conventional optical fibers wherein the attenuation of optical energy of wavelengths extending from approximately 1500 to 1570 nm. is substantially minimized. As will be described more fully below, the transmission range of the inventive optical fiber communication link 10 is enhanced by selecting one or both of the optical carrier wavelengths W1 and W2 to be within this transmission window.

As shown in FIG. 1, a bobbin 18 is connected to the fiber-optic cable 16 at one end thereof and attached to the vehicle subsystem 12 by a first optical fiber connector 20. The fiber-optic cable 16 is initially wound around the first and a second bobbin 18 and 19 and is dispensed therefrom as the vehicle 12 moves away from the control station 14. The connector 20 allows passage of light energy between the bobbin 18 and a dichroic wavelength division multiplexer/coupler 22. The multiplexer 22 has first, second and third ports 23, 24, and 25 and is disposed to direct optical energy of wavelength W2 entering the first port 23 to the third port 25. Similarly, the multiplexer 22 is configured to route optical energy at wavelength W1 entering the second port 24 to the first port 23. The coupler 22 is commercially available from vendors such as Gould Inc., Fiber Optics Division of Glen Burnie, Maryland.

The fiber-optic cable 16 is operatively coupled to a control station multiplexer 26 through the bobbin 19 and a second optical fiber connector 28. The multiplexer 26 is substantially identical to the multiplexer 22 and has first, second and third ports 29, 30, and 32. Again, optical energy of wavelength W1 entering the first port 29 is directed to the third port 32. The multiplexer 26 is further disposed to guide optical energy of wavelength W2 entering the second port 30 to the first port 29.

Disposed within the vehicle subsystem 12 and control station 14 are first and second transmit sections 36 and 37, respectively. The first transmit section 36 includes a downlink multiplexer 38, a transmitter driver 40 and a laser diode transmitter 42. The multiplexer 38 accepts input from a multiple channel data bus 43 and outputs a multiplexed electrical signal to the driver 40. The driver 40 includes circuitry for generating a digital downlink waveform in response to the data stream from the multiplexer 38. For example, it may be desired to translate a relatively large 200 Mb/s data rate from the multiplexer 38 into an encoded baseband digital waveform having a frequency of 200 MHz. In this instance the digital downlink waveform would be synthesized by the driver 40 by a 200 MHz analog current modulation signal. The digital current waveform from the driver 40 is used to modulate an optical carrier centered at the wavelength W1 produced by a laser diode or light emitting diode within the laser diode transmitter 42. This modulated optical carrier is then launched onto the optical fiber 16 via the multiplexer 22. In this manner a relatively wideband downlink signal spanning the first frequency spectrum is transmitted from the vehicle subsystem 12 to the control station subsystem 14 by modulating an optical carrier about the wavelength W1.

Similarly, the second transmit section 37 includes a control station uplink multiplexer 44, a control station transmitter driver 46 and a control station laser diode transmitter 48. Again, the multiplexer 44 accepts input from a multiple channel data bus 50 and outputs a multiplexed electrical signal to the driver 46. The driver 46 includes circuitry for generating a digital uplink waveform in response to the data stream from the multiplexer 44. For example, it may be desired to translates a 2 Mb/s data rate from the multiplexer 44 into an encoded digital waveform. In this instance the driver 46 would synthesize the digital waveform using a 2 MHz current modulation signal or by frequency modulating a subcarrier signal across a second frequency spectrum above the downlink baseband. The digital uplink waveform from the driver 46 is used to modulate the optical carrier centered at the wavelength W2 produced by a laser diode or light emitting diode within the laser diode transmitter 48. This modulated optical carrier is then launched onto the optical fiber 16 via the multiplexer 26.

Disposed within the vehicle subsystem 12 and the control station subsystem 14 are vehicle and control station receive sections 54 and 56, respectively. The vehicle receive section 54 includes a demultiplexer 57 and receiver 58 with associated AGC circuitry 60. As shown in FIG. 1, the optical carrier modulated by the uplink waveform is relayed from the optical fiber 16 to the receiver 58 through the multiplexer 22. The receiver 58 includes a photodetector which generates an electrical signal in response to the incident optical waveform. The AGC circuitry 60 then compensates for fluctuations in the power of this electrical signal. Next, the electrical signal is separated into its constituent components by the demultiplexer 57—which then directs each constituent signal to the appropriate channel of a data bus 61.

The control station receive section 56 within the control station 14 is similarly configured. Specifically, the control station receive section 56 includes a second demultiplexer 62 and a second receiver 64 with associated AGC circuitry 66. As shown in FIG. 1, the optical carrier modulated by the downlink waveform is relayed from the optical fiber 16 to the receiver 64 by the bobbin 19 and multiplexer 26. The receiver 64 includes a photodetector which generates an electrical signal in response to the incident optical waveform. The AGC circuitry 66 then compensates for fluctuations in the power of this electrical signal. Again, the electrical signal generated by the receiver 64 is separated into its constituent components by the demultiplexer 62—which then directs each constituent signal to the appropriate channel of a data bus 68.

In the first preferred embodiment of FIG. 1, the high data rate of the downlink multiplexer 38 relative to that of the uplink multiplexer 44 requires that the minimum spectral bandwidth of the downlink signal be proportionately larger than that of the uplink signal. It follows that the bandwidth of the receiver 64 is generally designed to be larger than that of the receiver 58. As mentioned in the Background of the Invention, the noise and signal bandwidths of a receiver are proportional; hence, wideband receivers are typically less sensitive than those having narrow bandwidths. Thus, in conventional optical fiber links wherein transmission range is limited by fiber-induced signal loss (as opposed to dispersion), the sensitivity of the wideband receiver determines the maximum length—typically 20 km—of conventional fiber links.

In accordance with the present teachings, this limitation is substantially overcome by utilizing a downlink carrier wavelength W1 within the transmission window of 1500 to 1570 nm. Optical energy transmitted at wavelengths within this window suffers the minimum fiber-induced loss and thus the range-limiting effect of the inherently low sensitivity wideband receiver 64 is substantially negated. Specifically, for a downlink carrier W1 within the transmission window and an uplink carrier W2 of 1300 nm., the transmission range of the communication link 10 of the present invention may be extended to on the order of 160 km.

The transmission range of the illustrative embodiment of FIG. 1 may be further improved by including both the first W1 and the second W2 optical carrier wavelengths within the transmission window. The requisite uplink and downlink channel isolation is achieved by substituting high isolation multiplexers 22' and 26' (not shown) for the multiplexers 22 and 26. In particular, the multiplexers 22' and 26' each include at least a pair of serially connected wavelength-selecting fusion type optical couplers. The serial concatenation of the individual fusion type couplers (available from, for example, Gould Inc., Fiber Optics Division of Glen Burnie, Md.) enables greater inter-channel isolation than has generally been demonstrated by conventional bidirectional fiber optic links. Uplink and downlink channel parasitic coupling is further suppressed by selecting the optical carrier wavelengths W1 and W2 to be at the boundaries of the transmission window (1500 and 1570 nm.).

Figure 2:
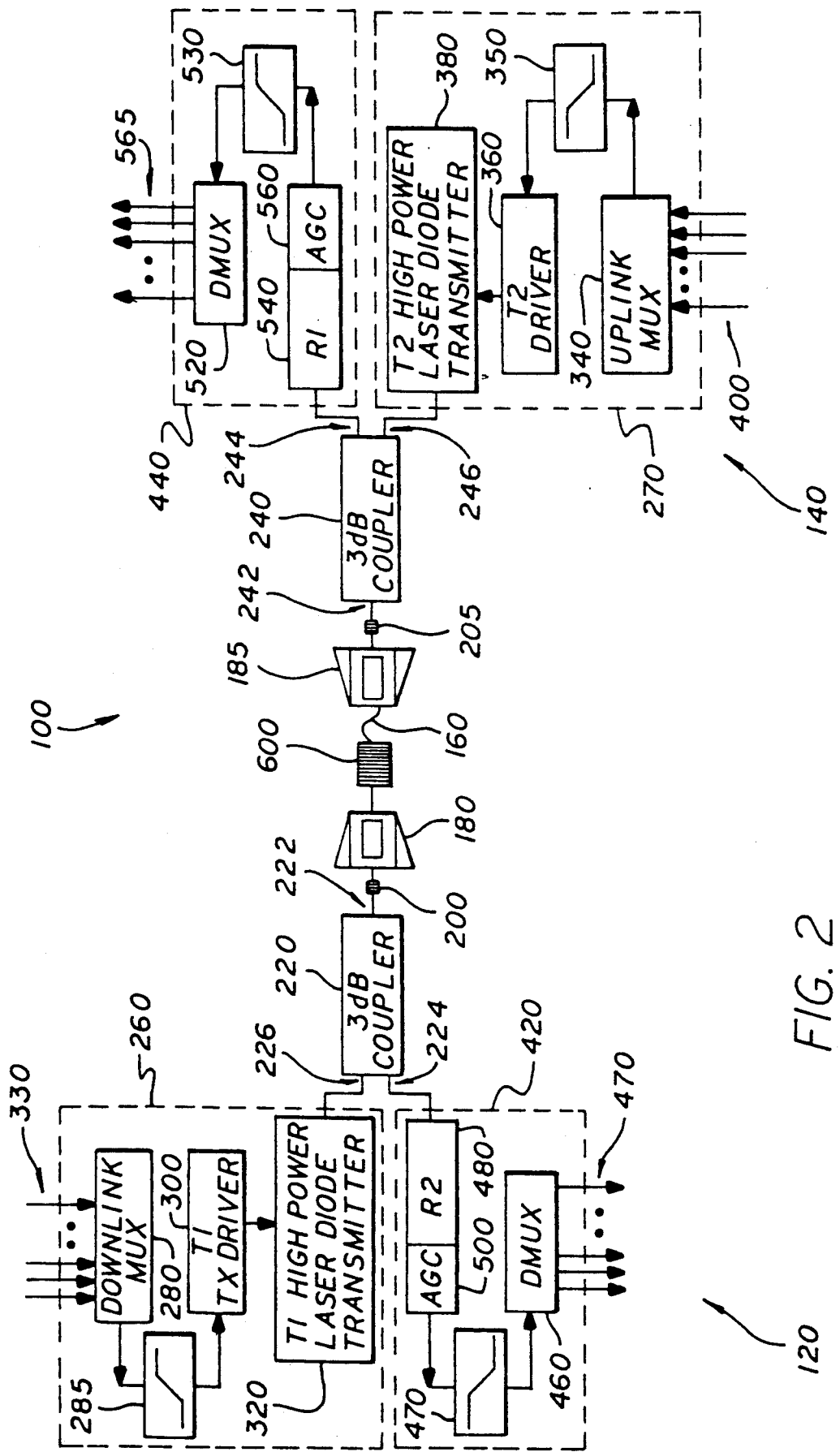
FIG. 2 is a block diagrammatic representation of an alternative embodiment of the long-range optical fiber communication link of the present invention.

An alternative embodiment of the long range bidirectional optical fiber communication link 100 of the present invention is shown in the block diagrammatic representation of FIG. 2. The link 100 facilitates communication between a vehicle subsystem 120 and control station subsystem 140 via an optical fiber 160. The fiber 160 conducts an optical carrier in each direction, with each carrier centered at a common wavelength W within the transmission window (typically 1500 to 1570 nm.) of the fiber 160. As will be discussed more fully below, signals sent from the vehicle 120 to the control station 140 occupy a first frequency spectrum and those sent in the opposing direction are confined to a nonoverlapping second frequency spectrum. The signals propagate along the fiber 160 via oppositely traveling optical carriers each modulated about the wavelength W.

As shown in FIG. 2, first and second bobbins 180 and 185 are connected to the fiber-optic cable 160 at each end thereof and are attached to the vehicle subsystem 120 and control station subsystem 140 by first and second optical fiber connectors 200 and 205. The fiber-optic cable 160 is initially wound around the bobbins 180 and 185 and is dispensed therefrom as the vehicle 120 moves away from the control station 140. The connectors 200 and 205 allow passage of light energy between the bobbins 180 and 185 and first and second 3 db optical fiber couplers 220 and 240. The first fiber coupler 220 has first, second and third ports 222, 224, and 226 and is disposed to split optical power entering the first port 222 between the second and third ports 224 and 226. The directivity (attenuation of optical energy between the second and third ports 224, 226) of commercially available fiber optic couplers such as the coupler 220 is approximately 60 to 70 db. The second coupler 240 is substantially identical to the coupler 220 and has first, second and third ports 242, 244, and 246. Again, optical power entering the first port 242 is split between the second and third ports 244 and 246.

Disposed within the vehicle subsystem 120 and control station 140 are first and second transmit sections 260 and 270, respectively. The first transmit section 260 includes a downlink multiplexer 280, a first pulse shaping circuit 285, a transmitter driver/modulator 300 and a laser diode transmitter 320. The multiplexer 280 accepts input from a multiple channel data bus 330 and outputs a multiplexed electrical signal to the pulse shaping circuit 285. The pulse shaping circuit 285 has a passband spanning a predetermined spectral range and thus limits the bandwidth of the electrical signal relayed to the modulator 300. The modulator 300 includes circuitry for generating a digital waveform of a known frequency in response to the conditioned electrical signal from the pulse shaping circuit 285. For example, it may again be desired to translate a 200 Mb/s data rate from the multiplexer 280 into a digital waveform having a frequency of 200 Mhz. The digital waveform from the modulator 300 is used to modulate the wavelength of an optical carrier centered at the wavelength W and produced by a laser diode or light emitting diode within the laser diode transmitter 320. This modulated optical carrier is then launched onto the optical fiber 160 via the 3 dB coupler 220. In this manner a digital downlink signal D confined to a first frequency spectrum is transmitted from the vehicle subsystem 120 to the control station subsystem 140 by modulating an optical carrier about the wavelength W included within the transmission window of the fiber 160.

Similarly, the second transmit section 270 includes a control station uplink multiplexer 340, a second pulse shaping circuit 350, a control station transmitter driver/modulator 360 and a control station laser diode transmitter 380. Again, the multiplexer 340 accepts input from a multiple channel data bus 400 and outputs a multiplexed electrical signal to the pulse shaping circuit 350. The pulse shaping circuit 350 has a passband spanning a predetermined spectral range and thus limits the bandwidth of the multiplexed digital signal relayed to the modulator 360. The modulator 360 includes circuitry for generating a digital waveform of a known frequency in response to the conditioned electrical signal from the pulse shaping circuit 350. For example, it may again be desired to translate a 2 Mb/s data rate from the multiplexer 340 into a band-limited digital waveform. Alternatively, the data stream from the multiplexer 340 may be impressed on a subcarrier (GHz range) which is spectrally segregated from the downlink data. The waveform from the modulator 360 is used to modulate the wavelength of an optical carrier centered at the wavelength W produced by a laser diode or light emitting diode within the laser diode transmitter 380. This modulated optical carrier is then launched onto the optical fiber 160 via the 3 dB coupler 240. In this manner a digital uplink signal U having a spectral power density profile segregated from that of the downlink signal is transmitted from the control station subsystem 140 to the vehicle subsystem 120 by modulating an optical carrier about the wavelength W. Alternatively, an analog signal confined to a second frequency spectrum substantially distinct from the first frequency spectrum may be utilized in lieu of the digital uplink signal.

Disposed within the vehicle subsystem 120 and the control station subsystem 140 are first and second receive sections 420 and 440, respectively. The first receive section 420 includes a demodulator/demultiplexer 460, a band pass filter 470 and a receiver 480 with associated AGC circuitry 500. As shown in FIG. 2, the optical waveform carrying the uplink signal U is relayed from the optical fiber 160 to the receiver 480 through the coupler 220. The receiver 480 includes a photodetector which generates an electrical signal in response to the incident optical waveform. The AGC circuitry 500 then compensates for fluctuations in the power of this electrical signal. The electrical signal from the photodetector is next routed to the band pass filter 470. The filter 470 has a passband encompassing the second frequency spectrum and a stopband including the first frequency spectrum. The receiver 480 and filter 470 are thus operative to recover the uplink signal U from an optical carrier and to suppress signals, including the downlink signal D, having spectral components outside of the second frequency spectrum. The uplink signal is then relayed by the filter 470 to the demultiplexer 460. The demultiplexer 460 separates the uplink signal into individual components which are then launched onto a data bus 470.

The second receive section 440 within the control station 140 is similarly configured. Specifically, the second receive section 440 includes a control station demodulator/demultiplexer 520, a second band pass filter 530 and a control station receiver 540 with associated AGC circuitry 560. As shown in FIG. 2, the optical waveform carrying the downlink signal D is relayed from the optical fiber 160 to the receiver 540 through the coupler 240. Again, the receiver 540 includes a photodetector which generates an electrical signal in response to the incident optical waveform. The AGC circuitry 560 compensates for fluctuations in the power of this electrical signal. The electrical signal from the photodetector is next routed to the bandpass filter 530. The filter 530 has a passband encompassing the first frequency spectrum and a stopband including the second frequency spectrum. The receiver 540 and filter 530 are thus operative to recover the downlink signal D from an optical carrier and to suppress signals, including the uplink signal, having spectral components outside of the first frequency spectrum. The downlink signal D is then relayed by the filter 530 to the demultiplexer 520. The demultiplexer 520 separates the downlink signal D into individual components which are then launched onto a data bus 565.

The transmission range of the link 100 may be further extended by inserting a semiconductor optical amplifier 600 in series with the optical fiber 160. Since only optical carriers centered at a common wavelength W propagate through the fiber 160, these carriers may be directly amplified by tuning the amplifier 600 to the wavelength W. In contrast, dual wavelength fiber-optic communication links typically require complex optical repeater circuits to effect intermediate amplification along the fiber.

While the present invention has been described herein with reference to a particular embodiment, it is understood that the invention is not limited thereto. The teachings of this invention may be utilized by one having ordinary skill in the art to make modifications within the scope thereof. For example, the present invention is not limited to the context of a remote guidance system. The transmission range augmentation techniques of the present invention may be utilized in other fiber optic communication links in which oppositely directed channels have disparate data rates, for example, one such system could be a bidirectional fiber optic system such as a "subscriber" cable television system. In such a system audio/video television data is transmitted in a first direction at a high rate while subscriber commands are carried via the oppositely directed low data rate channel.

Moreover, the invention is not limited to the particular spectrum of wavelengths defining the transmission window disclosed herein. In particular, certain optical fibers may have minimum loss spectra defined by wavelengths other than 1500 and 1570 nm. In addition, optical couplers dividing optical power between the second and third ports thereof asymmetrically may be substituted for the 3 dB optical couplers included in the embodiment of FIG. 2 without departing from the scope of the present invention. It is therefore contemplated by the appended claims to cover any and all such modifications, applications and embodiments.

Accordingly,

What is claimed is:

1. A long range bidirectional communication link comprising:

an optical fiber having a first and a second end wherein the attenuation of optical energy passing therethrough at wavelengths included within a transmission window is substantially minimized;

first means for launching a first optical carrier of a first wavelength onto said fiber at said first end thereof, said first launching means including means for impressing a first modulating signal spanning a first frequency spectrum upon said first carrier;

second means for launching a second optical carrier of a second wavelength included within said transmission window onto said fiber at said second end thereof, said second launching means including means for impressing upon said second carrier a second modulating signal spanning a second frequency spectrum larger than said first spectrum;

a first receiver of a first bandwidth encompassing said first frequency spectrum, coupled to said second end of said fiber, for extracting said first modulating signal from said first optical carrier; and a second receiver having a second bandwidth encompassing said second frequency spectrum, coupled to said first end of said fiber, for extracting said second modulating signal from said second optical carrier.

2. The bidirectional communication link of claim 1 wherein said transmission window extends from approximately 1500 nm. to 1570 nm.

3. A long range bidirectional communication link comprising:

an optical fiber having a first and a second end wherein the attenuation of optical energy passing therethrough at wavelengths included within a transmission window is substantially minimized;

first transmitter means for generating a first optical carrier of a first wavelength;

first modulator means for modulating said first optical carrier with a first modulating signal spanning a first frequency spectrum;

second transmitter means for generating a second optical carrier at a second wavelength included within said transmission window;

second modulator means for modulating said second optical carrier with a second modulating signal spanning a second frequency spectrum larger than said first frequency spectrum;

a first receiver of a first bandwidth encompassing said first frequency spectrum, for extracting said first modulating signal from said first optical carrier;

a second receiver having a second bandwidth encompassing said second frequency spectrum wherein said second bandwidth is larger than said first bandwidth, for extracting said second modulating signal from said second optical carrier;

first multiplexing means for linking said first transmitter means and said second receiver means to said first end of said optical fiber; and second multiplexing means for linking said second transmitter means and said first receiver means to said second end of said optical fiber.

4. A technique for maximizing the transmission range of a bidirectional communication link which includes an optical fiber having a first end and a second end wherein the attenuation of optical energy passing therethrough at wavelengths included within a transmission window is substantially minimized, comprising the steps of:
(a) launching a first optical carrier of a first wavelength onto said optical fiber at said first end thereof;
(b) impressing a first modulating signal spanning a first frequency spectrum upon said first carrier;
(c) launching a second optical carrier of a second wavelength within said transmission window onto said fiber at a second end thereof;
(d) impressing upon said second carrier a second modulating signal spanning a second frequency spectrum larger than said first spectrum;
(e) coupling a first receiver of a first bandwidth encompassing said first frequency spectrum to said second end of said fiber, said first receiver being disposed to extract said first modulating signal from said first optical carrier; and
(f) coupling a second receiver having a second bandwidth encompassing said second frequency spectrum to said first end of said fiber, said second receiver being disposed to extract said second modulating signal from said second optical carrier.

5. The technique of claim 4 wherein said transmission window extends from approximately 1500 nm. to 1570 nm.

6. A long range bidirectional communication link comprising:
an optical fiber having a first and a second end wherein the attenuation of optical energy passing therethrough at wavelengths included within a transmission window is substantially minimized;
first means for launching a first optical carrier of a first wavelength within said transmission window onto said fiber at said first end thereof, said first launching means including means for impressing a first modulating signal spanning a first frequency spectrum upon said first carrier;
second means for launching a second optical carrier of a second wavelength within said transmission window, not equivalent to said first wavelength, onto said fiber at said second end thereof, said second launching means including means for impressing upon said second carrier a second modulating signal spanning a second frequency spectrum;
a first receiver of a first bandwidth encompassing said first frequency spectrum, coupled to said second end of said fiber, for extracting said first modulating signal from said first optical carrier; and
a second receiver having a second bandwidth encompassing said second frequency spectrum, coupled to said first end of said fiber, for extracting said second modulating signal from said second optical carrier.

7. A long range bidirectional communication link comprising:
an optical fiber having a first and a second end wherein the attenuation of optical energy passing therethrough at wavelengths included within a transmission window is substantially minimized;
first transmitter means for generating a first optical carrier of a first wavelength within said transmission window;
first modulator means for modulating said first optical carrier with a first modulating signal spanning a first frequency spectrum;
second transmitter means for generating a second optical carrier at a second wavelength, not equivalent to said first wavelength, within said transmission window;
second modulator means for modulating said second optical carrier with a second modulating signal spanning a second frequency spectrum;
a first receiver of a first bandwidth encompassing said first frequency spectrum, for extracting said first modulating signal from said first optical carrier;
a second receiver having a second bandwidth encompassing said second frequency spectrum wherein said second bandwidth is larger than said first bandwidth, for extracting said second modulating signal from said second optical carrier;
first high-isolation multiplexing means for linking said first transmitter means and said second receiver means to said first end of said optical fiber; and
second high-isolation multiplexing means for linking said second transmitter means and said first receiver means to said second end of said optical fiber.

8. The bidirectional communication link of claim 7 wherein said first high-isolation multiplexing means includes first and second serially connected optical multiplexers and wherein said transmission window extends from approximately 1500 to 1570 nm.

9. A long range bidirectional communication link comprising:
an optical fiber having a first and a second end wherein the attenuation of optical energy passing therethrough at wavelengths included within a transmission window is substantially minimized;
first means for launching a first optical carrier of a first wavelength included within said transmission window onto said fiber at said first end thereof, said first launching means including means for impressing a first modulating signal confined to a first frequency spectrum upon said first carrier;
second means for launching a second optical carrier of said first wavelength onto said fiber at said second end thereof, said second launching means including means for impressing upon said second carrier a second modulating signal confined to a second frequency spectrum not overlapping said first spectrum;
a first receiver of a first bandwidth encompassing said first frequency spectrum, coupled to said second end of said fiber, for extracting said first modulating signal from said first optical carrier; and
a second receiver having a second bandwidth encompassing said second frequency spectrum, coupled to said first end of said fiber, for extracting said second modulating signal from said second optical carrier.

10. The bidirectional communication link of claim 9 wherein said transmission window extends from approximately 1500 to 1570 nm.

11. A long range bidirectional communication link comprising:

an optical fiber having a first and a second end wherein the attenuation of optical energy passing therethrough at wavelengths included within a transmission window is substantially minimized;

first transmitter means for generating a first optical carrier of a first wavelength within said transmission window;

first modulator means for modulating said first optical carrier with a first modulating signal confined to a first frequency spectrum;

second transmitter means for generating a second optical carrier of said first wavelength within said transmission window;

second modulator means for modulating said second optical carrier with a second modulating signal confined to a second frequency spectrum not overlapping said first spectrum;

a first receiver of a first bandwidth encompassing said first frequency spectrum, for extracting said first modulating signal from said first optical carrier;

a second receiver having a second bandwidth encompassing said second frequency spectrum for extracting said second modulating signal from said second optical carrier;

first optical coupler means for coupling said first transmitter means and said second receiver means to said first end of said optical fiber; and second optical coupler means for coupling said second transmitter means and said first receiver means to said second end of said optical fiber.

12. The bidirectional communication link of claim 11 further including first and second band pass filters connected to said first and second receivers, respectively.

13. The bidirectional communication link of claim 11 wherein said optical fiber includes first and second segments optically coupled by an optical amplifier having a passband which includes said first wavelength.

14. In a system including a missile, a control station and an optical fiber therebetween wherein the attenuation of optical energy passing through said fiber at wavelengths included within a transmission window is substantially minimized, a bidirectional communication link comprising:

bobbin means for coupling a first end of said optical fiber to said missile;

first means, included within said missile, for launching a first optical carrier of a first wavelength onto said fiber at said first end thereof, said first launching means including means for impressing a first modulating signal spanning a first frequency spectrum upon said first carrier;

second means, included within said control station, for launching a second optical carrier of a second wavelength included within said transmission window onto said fiber at said second end thereof, said second launching means including means for impressing upon said second carrier a second modulating signal spanning a second frequency spectrum larger than said first spectrum;

a first receiver of a first bandwidth encompassing said first frequency spectrum, included within said control station and coupled to said second end of said fiber, for extracting said first modulating signal from said first optical carrier; and a second receiver having a second bandwidth encompassing said second frequency spectrum, included within said missile and coupled to said first end of said fiber, for extracting said second modulating signal from said second optical carrier.

15. In a system including a missile, a control station and an optical fiber therebetween wherein the attenuation of optical energy passing through said fiber at wavelengths included within a transmission window is substantially minimized, a bidirectional communication link comprising:

bobbin means for coupling a first end of said optical fiber to said missile;

first means, included within said missile, for launching a first optical carrier of a first wavelength included within said transmission window onto said fiber at said first end thereof, said first launching means including means for impressing a first modulating signal confined to a first frequency spectrum upon said first carrier;

second means, included within said control station, for launching a second optical carrier of said first wavelength onto said fiber at said second end thereof, said second launching means including means for impressing upon said second carrier a second modulating signal confined to a second frequency spectrum not overlapping said first spectrum;

a first receiver of a first bandwidth encompassing said first frequency spectrum, said first receiver being coupled to said second end of said fiber and included within said control station, for extracting said first modulating signal from said first optical carrier; and a second receiver having a second bandwidth encompassing said second frequency spectrum, said second receiver being included within said missile and coupled to said first end of said fiber, for extracting said second modulating signal from said second optical carrier.

16. A technique for maximizing the transmission range of a bidirectional communication link which includes an optical fiber having a first end and a second end wherein the attenuation of optical energy passing therethrough at wavelengths included within a transmission window is substantially minimized, comprising the steps of:

(a) launching a first optical carrier of a first wavelength within said transmission window onto said optical fiber at said first end thereof;

(b) impressing a first modulating signal confined to a first frequency spectrum upon said first carrier;

(c) launching a second optical carrier of said first wavelength onto said fiber at a second end thereof;

(d) impressing upon said second carrier a second modulating signal confined to a second frequency spectrum not overlapping said first spectrum;

(e) coupling a first receiver of a first bandwidth encompassing said first frequency spectrum to said second end of said fiber, said first receiver being disposed to extract said first modulating signal from said first optical carrier; and (f) coupling a second receiver having a second bandwidth encompassing said second frequency spectrum to said first end of said fiber, said second receiver being disposed to extract said second modulating signal from said second optical carrier.

17. The technique of claim 16 wherein said transmission window extends from approximately 1500 to 1570 nm.

* * * * *